United States Patent

[11] 3,559,531

[72] Inventors Kurt W. Leibfritz
 Norridge;
 Lester W. Malinowski, Mt. Prospect, Ill.
[21] Appl. No. 744,803
[22] Filed July 15, 1968
[45] Patented Feb. 2, 1971
[73] Assignee Parker-Hannifin Corporation
 Cleveland, Ohio
 a corporation of Ohio

[54] SPEED CONTROL VALVE FOR A FLUID MOTOR
 1 Claim, 4 Drawing Figs.
[52] U.S. Cl. ................................................. 91/26,
 91/396; 137/454.5
[51] Int. Cl. .................................................. F15b 15/22,
 F16k 25/00, F16k 51/00
[50] Field of Search ....................................... 91/26, 394,
 395, 396; 137/454.5, 454.6

[56] References Cited
UNITED STATES PATENTS

| | | | |
|---|---|---|---|
| 2,464,962 | 3/1949 | Bent | 91/26 |
| 3,303,746 | 2/1967 | Schmoeger | 91/26 |
| 1,953,358 | 4/1934 | Mantz | 137/454.6 |
| 1,988,966 | 1/1935 | Eckhouse | 137/454.6 |
| 3,160,390 | 12/1964 | Banks | 137/454.6 |

FOREIGN PATENTS

| | | | |
|---|---|---|---|
| 145,169 | 2/1952 | Australia | 91/26 |

Primary Examiner—Paul E. Maslousky
Attorney—John N. Wolfram

ABSTRACT: A speed control valve for a fluid motor of the piston and cylinder type in which the valve seat engageable by the head of the valve member is inwardly facing whereby the valve member cannot be removed from the valve in an outwardly direction.

INVENTORS:
KURT W. LEIBFRITZ
LESTER W. MALINOWSKI
BY: John N. Wolfram
ATTORNEY

SPEED CONTROL VALVE FOR A FLUID MOTOR

BACKGROUND OF THE INVENTION

In fluid motors of the piston and cylinder type, and particularly for pneumatic operation, it is common practice to cushion the stopping of the piston at the ends of its stroke to avoid sudden impact of the piston with the cylinder end caps. This is done by trapping some of the fluid being exhausted from the cylinder ahead of the piston when the piston is near the end of its stroke and slowly bleeding the trapped fluid from the cylinder. The rate of bleed is controlled by a speed control valve that is usually of the needle-type with a valve stem threaded into a bore in the cylinder end cap and accessible from the cylinder exterior for adjustment relative to its seat. However, such valve stems may be removed by unthreading completely from the threaded bore. This is sometimes done inadvertently during adjustment of the same while the cylinder is in operation and the valve stem can either cause injury or damage or become lost by being blown away from the cylinder upon becoming unthreaded.

SUMMARY OF THE INVENTION

The invention solves the problem of inadvertent unthreading of the valve stem by providing a backseating arrangement in which the valve stem moves toward instead of away from its seat when threaded in a direction outwardly of the cylinder. Engagement of the stem with the seat prevents the stem from being unthreaded from the cylinder.

DESCRIPTION OF THE INVENTION

Figure 1:
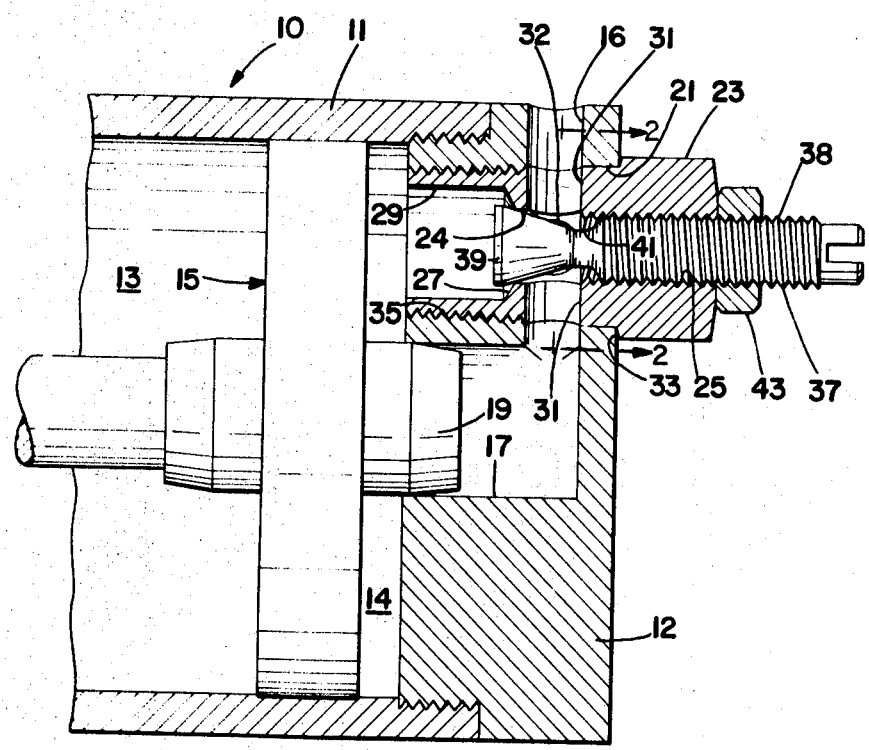
FIG. 1 is a fragmentary cross section view of one end of a cylinder and the associated speed control valve.
Figure 2:
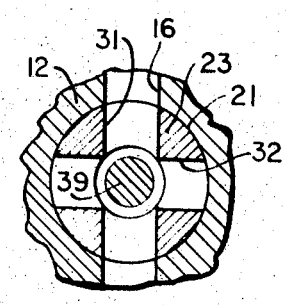
FIG. 2 is a fragmentary cross section view taken along the lines 2-2 of FIG. 1.

Cylinder 10 has a cylinder tube 11 closed by an end cap 12 and is divided into two fluid receiving chambers 13 and 14 by piston 15. End cap 12 has a passage 16 which includes an axial portion 17 through which fluid may be admitted to and exhausted from chamber 14. Piston 15 has a spear 19 projecting therefrom that enters passage portion 17 when the piston nears end cap 12.

End cap 12 has an opening 21 therethrough that is threaded at its inner end for threadedly receiving a plug 23. The latter has a bore 24 therethrough which is threaded as at 25 at its outer end and has an inwardly facing valve seat 27 and a counterbore 29 at its inner end. Counterbore 29 is open to chamber 14 and forms an enlarged portion of bore 24.

Figure 3:
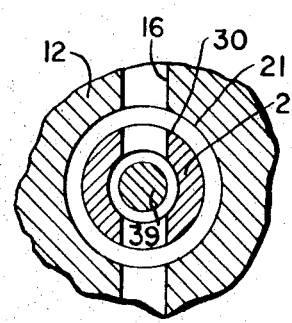
FIG. 3 is a fragmentary view corresponding to FIG. 2 but showing an alternate form of the device.
Figure 4:
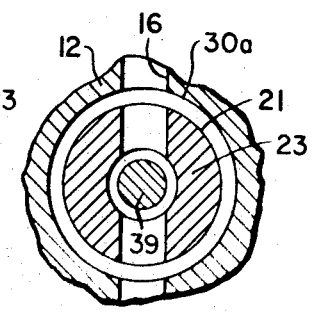
FIG. 4 is a fragmentary view corresponding to FIG. 2 but showing still another form of the device.

Plug 23 also has a pair of transverse through ducts 31, 32 that intersect bore 24. One or the other of through ducts 31, 32 will register with end cap passage 16 so as to form a part thereof when plug 23 is threaded into end cap 12. Alternatively, plug 23 may have an annular groove 30 as shown in FIG. 3 that is intersected by ducts 31 to assure full communication of the latter with passage 16, or such a groove may be formed in cap 12 as shown at 30a in FIG. 4. A shoulder 33 on plug 23 engages the outer surface of end cap 12 to locate plug 23 so that ducts 31, 32 will have their axes coplanar with the axis of end cap passage 16. The threaded connection 35 between plug 23 and opening 21 is preferably in a form of a tapered pipe thread so as to establish a sealed connection.

A valve stem 37 has an outer threaded section 38 engaged with thread 25 and has an enlarged head 39 at its inner end that is of a diameter larger than seat 27 and has a reduced diameter portion 41 outward of head 39.

OPERATION

During normal operation of cylinder 10, stem 37 has an adjusted position in which head 39 is slightly unseated from seat 27 to provide a restricted flow of fluid therebetween and it is locked in this position by locknut 43 threadedly engaged with stem 37. To move piston 15 to the left from the position shown, cylinder chamber 13 is connected to exhaust.

We claim:

1. A fluid motor comprising a cylinder having a piston therein and having a passage for introducing fluid to and from the cylinder and having an opening intersecting said passage, an inner end of the opening communicating with the interior of the cylinder, and an outer end of the opening communicating with the cylinder exterior, said opening including a threaded section, a valve attached to said cylinder, said valve comprising: a plug mounted in the opening and having a threaded connection with said threaded section and having inner and outer ends, the plug also having a duct intermediate said plug inner and outer ends communicating with said passage, said plug having a bore therethrough intersecting the duct, said plug bore having an inner end communicating with the cylinder interior, and having a threaded outer end open to the exterior of the plug, said plug having a valve seat facing the innner end of the plug bore, a valve member threadably engaged with the threaded bore and exposed to the exterior of the plug, the valve member projecting through said seat into the inner end of said plug bore, said valve member having a head within said inner end of the plug bore of larger diameter than said seat whereby said valve member cannot be withdrawn from said plug bore in a direction toward the outer end of the plug bore.